(12) United States Patent
Cheng

(10) Patent No.: US 8,444,172 B2
(45) Date of Patent: May 21, 2013

(54) STROLLER AND BASKET FRAME OF THE SAME

(75) Inventor: Manqun Cheng, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 277 days.

(21) Appl. No.: 12/926,604

(22) Filed: Nov. 30, 2010

(65) Prior Publication Data

US 2011/0215552 A1  Sep. 8, 2011

(30) Foreign Application Priority Data

Mar. 2, 2010  (CN) .......................... 2010 1 0134594

(51) Int. Cl.
*B62B 7/10* (2006.01)
*B62B 9/26* (2006.01)

(52) U.S. Cl.
CPC ........................................ *B62B 9/26* (2013.01)
USPC .......................................................... 280/650

(58) Field of Classification Search
CPC ......................................................... B62B 9/26
USPC ... 280/47.38, 642, 647, 650, 658; 248/183.3, 248/292.13, 665; 403/112, 113
See application file for complete search history.

(56) References Cited

U.S. PATENT DOCUMENTS

| | | | | |
|---|---|---|---|---|
| 3,030,128 | A * | 4/1962 | Versen ........................... | 285/185 |
| 7,011,318 | B2 * | 3/2006 | Chen ........................... | 280/47.38 |
| 7,445,229 | B2 * | 11/2008 | Dotsey et al. ................. | 280/642 |
| 7,588,263 | B2 * | 9/2009 | Yang .............................. | 280/642 |
| 2005/0161912 | A1 * | 7/2005 | Cheng et al. .................. | 280/647 |

* cited by examiner

Primary Examiner — John R Olszewski
Assistant Examiner — Brian Cassidy
(74) Attorney, Agent, or Firm — Bacon & Thomas, PLLC

(57) ABSTRACT

A basket frame of a stroller comprises a connecting device connected between a front frame and a rear frame. The connecting device comprises a first connector having a first pivot part, a second connector having a second pivot part, and a torsion spring. The first pivot part is pivotally connected to the second pivot part. An application of a downward force on the rear frame deforms the torsion spring and causes the rear frame to pivot downward. A removal of the downward force causes a spring return to make the rear frame to return to a fixed position.

8 Claims, 4 Drawing Sheets

STROLLER AND BASKET FRAME OF THE SAME

FIELD OF THE INVENTION

The present invention relates to a basket frame of a stroller. More specifically, the present invention relates to a basket frame that can be moved to a lower position, thereby preventing the basket frame from damages due to misuse.

BACKGROUND OF THE INVENTION

A stroller is a necessity for a family having an infant. When the parent goes outdoors with his infant, the stroller is used to carry the infant. Many strollers incorporate a basket under the baby seat to place articles carried by the parent to reduce the burden and inconvenience to the parent.

However, the basket frame is often damaged by stepping on it while using or operating the stroller because the basket is located at the lower part of the stroller on which the parent often steps. The parent is often hindered from correctly putting his foot to brake the stroller so as to fold or unfold the stroller while holding the infant, and he may step on the basket frame. This causes damages to the basket frame.

SUMMARY OF THE INVENTION

An object of the present invention is to provide a basket frame that can be adjusted to a lower position, thereby preventing the basket frame from damages due to misuse.

According to the present invention, a stroller comprises: a stroller frame; a seat connected to the stroller frame; a wheel pivotally connected to the stroller frame; and a basket frame below the seat. The basket frame comprises: a front frame; a rear frame; and a connecting device connected between the front frame and the rear frame. The connecting device comprises: a first connector connected to the front frame and having a first pivot part; a second connector connected to the rear frame and having a second pivot part, the second pivot part being pivotally connected to the first pivot part so that the rear frame can pivot relative to the front frame; and a torsion spring provided between the first pivot part and the second pivot part, two ends of the torsion spring being respectively placed against the first pivot part and the second pivot part. An application of a downward force on the rear frame deforms the torsion spring and causes the rear frame to pivot downward, and a removal of the downward force causes a spring return to make the rear frame to return to a fixed position.

Preferably, the first pivot part has a first positioning block and the second pivot part has a second positioning block, and when the rear frame is placed at the fixed position, the torsion spring biases the first pivot part and the second pivot part so that the first positioning block abuts against the second positioning block and thus the rear frame is prevented from pivoting upward beyond the fixed position.

Preferably, each of the first pivot part and the second pivot part has a pivot shaft, a groove bottom and a groove wall; the pivot shaft and the groove wall project from the groove bottom; the pivot shaft, the groove bottom and the groove wall define a ring groove around the pivot shaft; and the pivot shaft is placed into the torsion spring.

Preferably, each of the first positioning block and the second positioning block is in form of a rib and each rib projects from the corresponding groove bottom with a projection height greater than that of the groove wall, so that an engagement of the groove wall of the first pivot part with the groove wall of the second pivot part allows the first positioning block to abut against the second positioning block.

Preferably, each of the ribs of the first pivot part and the second pivot part has a cut for fastening a fixing arm at each of the two ends of the torsion spring therein.

Preferably, an abutment end of each of the first positioning block and the second positioning block has a substantial T shape.

Preferably, the first positioning block and the second positioning block have the same structure.

DETAILED DESCRIPTION OF THE INVENTION

Figure 1:
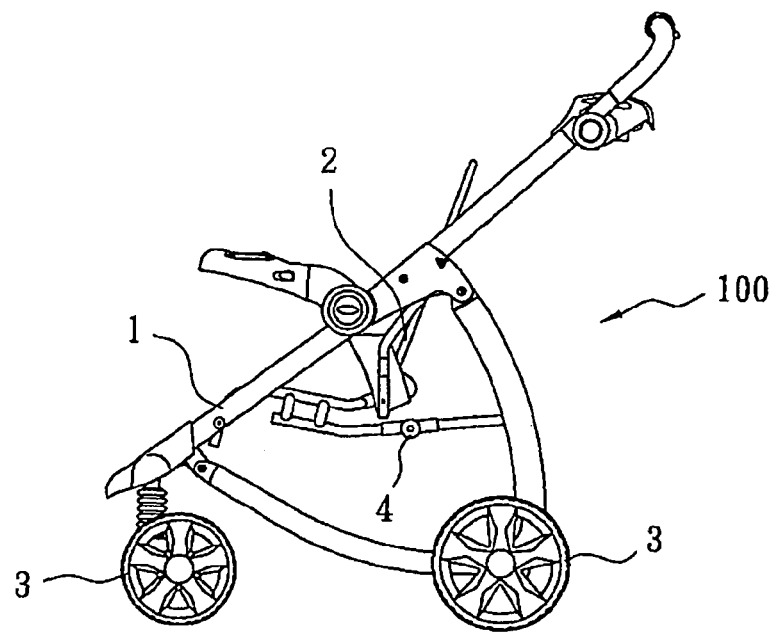
FIG. 1 is a side view of a stroller in use according to an embodiment of the present invention.

The present invention is now described in detail with respect to an embodiment by referring to the drawings.

FIG. 1 is a side view of a stroller in use according to an embodiment of the present invention. As shown in FIG. 1, a stroller 100 comprises a stroller frame 1, a seat 2 connected to the stroller frame 1, wheels 3 pivotally connected to the stroller frame 1, and a basket frame 4 mounted below the seat 2. For simplicity and clarity of illustration, a basket is omitted in the figure to avoid unnecessarily obscuring the discussion of the invention.

Figure 2:
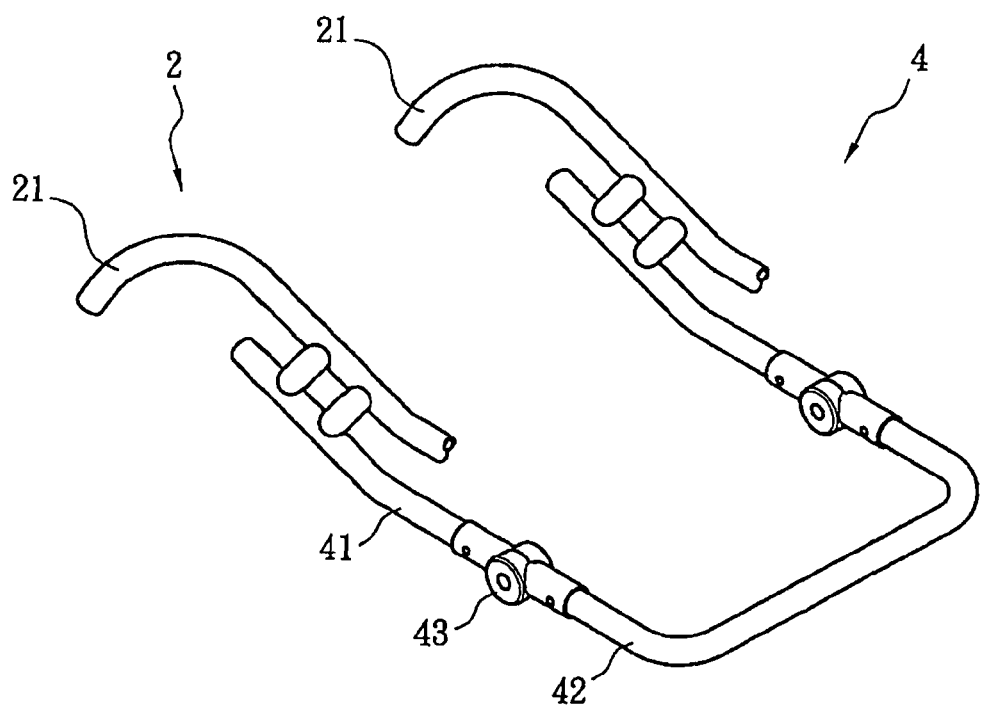
FIG. 2 is perspective view of an assembly of the basket frame according to the present invention.
Figure 3:
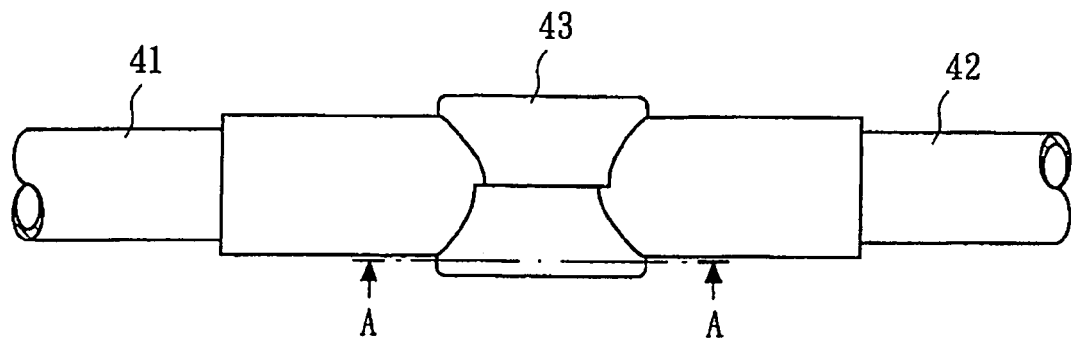
FIG. 3 is a partial top view of the basket frame according to the present invention.

FIG. 2 is perspective view of an assembly of the basket frame according to the present invention. FIG. 3 is a partial top view of the basket frame according to the present invention. As shown in FIGS. 2 and 3, the basket frame 4 comprises a front frame 41, a rear frame 42 and a connecting device 43. The connecting device 43 is mounted between the front frame 41 and the rear frame 42 to connect the front frame 41 to the rear frame 42. One end of the front frame 41 is connected to a tube support 21 for the seat 21.

Figure 4:
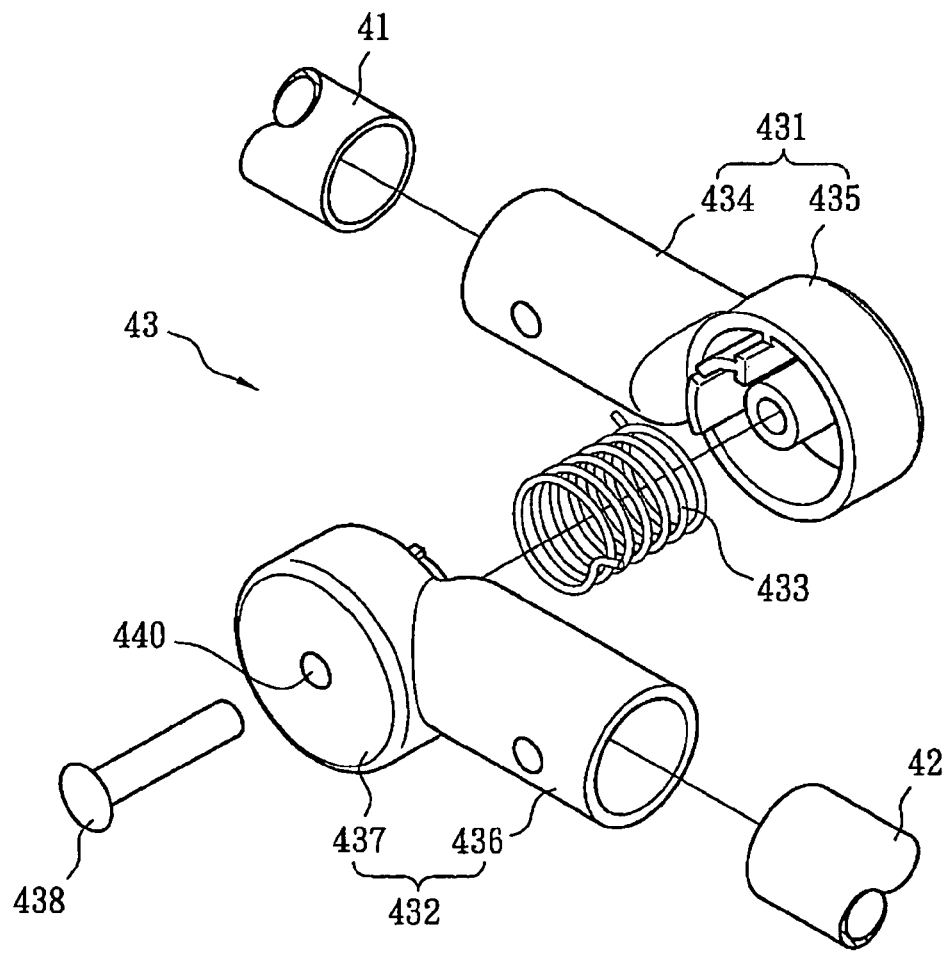
FIG. 4 is an exploded view of the basket frame according to the present invention.

FIG. 4 is an exploded view of the basket frame according to the present invention. As shown in FIG. 4, the connecting device 43 comprises a first connector 431, a second connector 432 and a torsion spring 433. The first connector 431 has a first pivot part 435 and a fixing part 434 that is firmly connected to the front frame 41. The second connector 432 has a second pivot part 437 and a fixing part 436 that is firmly connected to the rear frame 42. The second pivot part 437 of the second connector 432 is pivotally connected to the first pivot part 435 of the first connector 431. A torsion spring 433 is mounted between and against the first pivot part 435 and the second pivot part 437 and can provides an elastic force that attempts to return the rear frame 42 relative to the front frame.

A nut and a rivet 438 penetrating two central pivot shafts 440 are used to pivotally connect the first pivot part 435 to the second pivot part 437.

Figure 5:
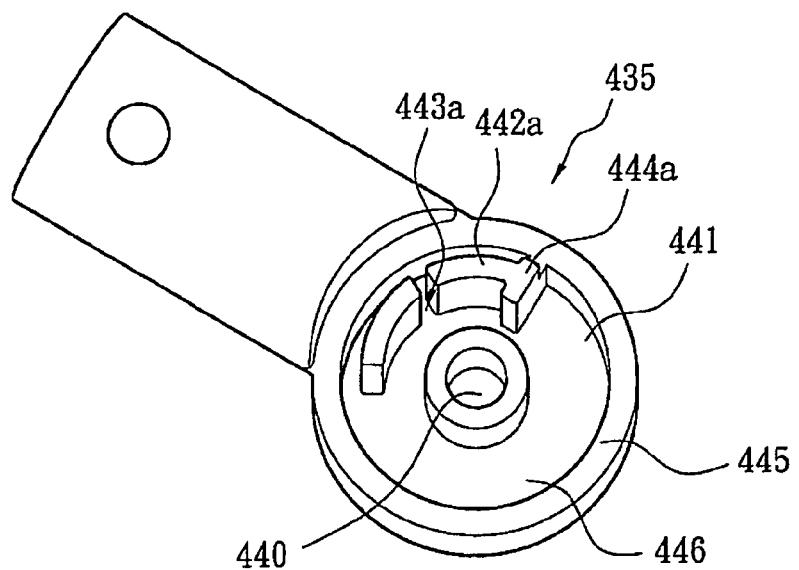
FIG. 5 shows the detail structure of the pivot part according to the present invention.

FIG. 5 shows the detail structure of the pivot part. In this embodiment, the first pivot part 435 and the second pivot part 437 have the same structure. The first pivot part 435 will be described here. As shown in FIG. 5, the first pivot part 435 has a central pivot shaft 440, a groove wall 445 and a groove bottom 446 formed thereon. The pivot shaft 440 and the groove wall 445 project from the groove bottom 446. The pivot shaft 440, the groove wall 445 and the groove bottom 446 define a ring groove 441 around the pivot shaft 440. A positioning rib 442a is formed in the ring groove 441 and projects from the groove bottom 446 with a projection height greater than that of the groove wall 445 so that the positioning rib 442a of the first pivot part 435 can engage with the ring groove (not shown) of the second pivot part 437. The positioning rib 442a extends in an arc along the direction of the ring groove 441 to define the pivot of the rear frame 42. The positioning rib 442a has an abutment end 444a of T shape. The abutment end 444a of the positioning rib 442a in the first pivot part 435 abuts against an abutment end 444b of the positioning rib 442b in the second pivot part 437 when the rear frame 42 returns to a fixed position.

Further, the positioning rib 442a has a cut 443a for fastening the torsion spring 433. The pivot shaft 440 is placed into the torsion spring 433 that is mounted at the place where the first pivot part 435 and the second pivot part 437 is pivotally connected. Fixing arms 433a, 433b at two ends of the torsion spring 433 are respectively fastened in the cut 443a of the positioning rib 442a and a cut 443b of the positioning rib 442b.

The operation of the stroller in use with (FIG. 7) or without (FIG. 6) downward force applied on the rear frame of the basket according to the present invention is now described in detail.

Figure 6:
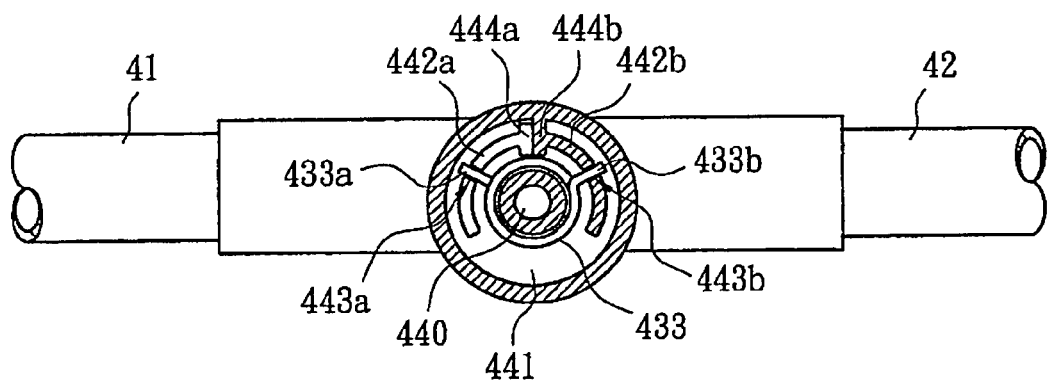
FIG. 6 is a sectional view of the basket frame of the stroller in use without downward force applied on the rear frame according to the present invention taken along line A-A in FIG. 3.

As shown in FIG. 6, when no downward force is applied on the rear frame 42 and thus the torsion spring 433 is not deformed, the torsion spring 433 biases the first pivot part 435 and the second pivot part 437 so that the T-shape abutment end 444a of the positioning rib 442a in the first pivot part 435 abuts against the T-shape abutment end 444b of the positioning rib 442b in the second pivot part 437, thereby preventing the rear frame 42 from pivoting upward.

Figure 7:
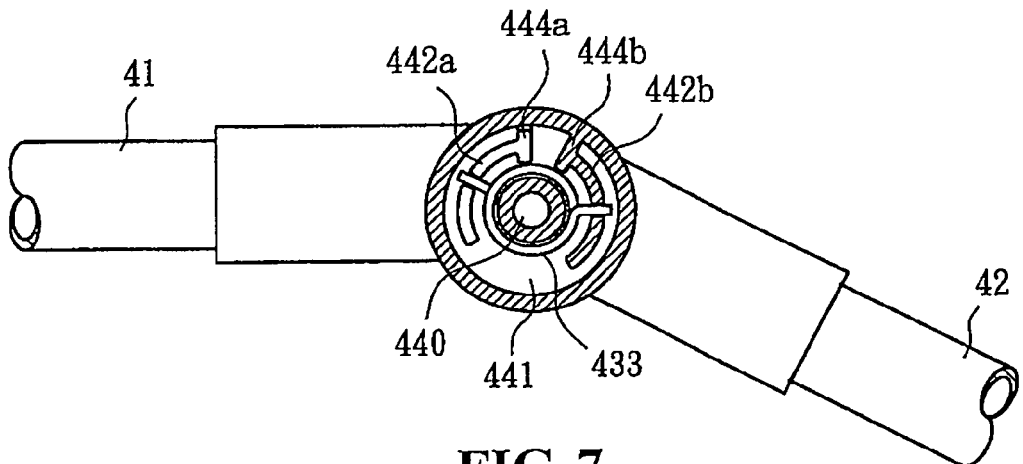
FIG. 7 is a sectional view of the basket frame of the stroller with downward force applied on the rear frame according to the present invention taken along line A-A in FIG. 3.

As shown in FIG. 7, when a downward force is applied on the rear frame 42 and thus the torsion spring 433 placed against the first pivot part 435 and the second pivot part 437 is deformed, the rear frame 42 pivots downward about the pivot shaft 440 and thus the abutment end 444b is separated from the abutment end 444a. When the downward force is removed from the rear frame 42 and thus the torsion spring 433 returns, the rear frame 42 returns to the fixed position shown in FIG. 6 and again the T-shape abutment end 444b abuts against the T-shape abutment end 444a.

Figure 8:
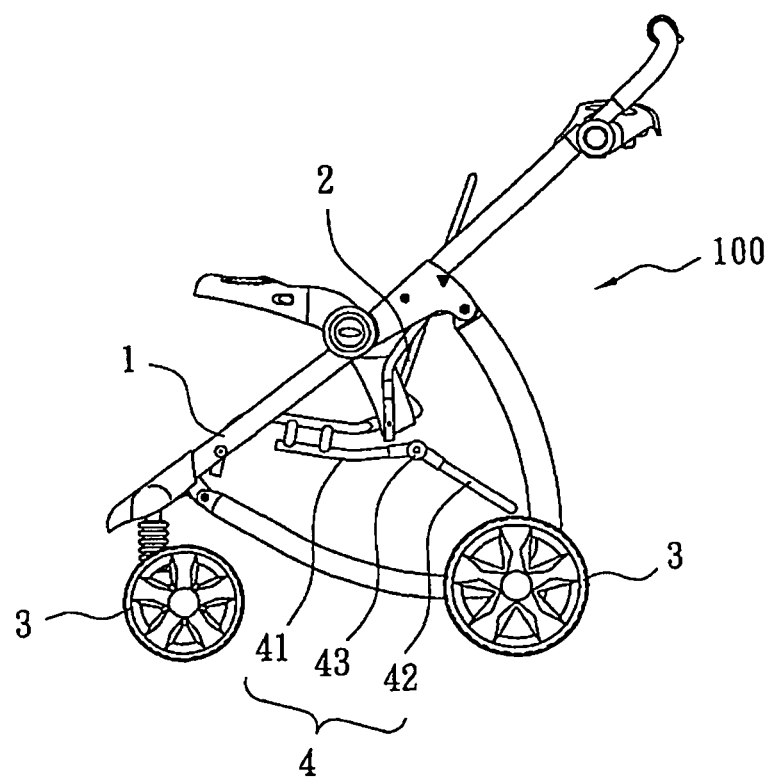
FIG. 8 is a side view of the stroller with downward force applied on the rear frame according to the present invention.

As shown in FIG. 8, a downward force is applied on the rear frame 42 while stepping on the basket frame 4 of the stroller 100 due to misuse to cause the rear frame 42 to pivot downward.

According to the present invention, when users exerts a downward force on the basket frame 4 due to misuse of the stroller, for example stepping on the rear frame 42 of the basket frame 4, the rear frame 42 can pivot downward to avoid damage due to the application of the downward force on the basket frame 4. Further, when the downward force is removed from the rear frame 42, the rear frame 42 returns to the fixed position in use and is prevented from pivoting upward beyond the fixed position, thereby avoid damage to the basket frame 4.

The present invention has been described with respect to the embodiment. However, it shall be understood that the embodiment is a preferred embodiment and is not intended to be limiting. Therefore, various changes and modifications may be made without departing from the spirit or the scope of the present invention. All such changes and modifications fall into the scope of the present invention.

What is claimed is:

1. A basket frame of a stroller, comprising:
   a front frame;
   a rear frame; and
   a connecting device connected between the front frame and the rear frame, the connecting device comprising:
   a first connector connected to the front frame and having a first pivot part;
   a second connector connected to the rear frame and having a second pivot part, the second pivot part being pivotally connected to the first pivot part so that the rear frame can pivot relative to the front frame; and
   a torsion spring provided between the first pivot part and the second pivot part, two ends of the torsion spring being respectively placed against the first pivot part and the second pivot part,
   wherein an application of a downward force on the rear frame deforms the torsion spring and causes the rear frame to pivot downward, and a removal of the downward force causes a spring return to make the rear frame to return to a fixed position,
   wherein the first pivot part has a first positioning block and the second pivot part has a second positioning block, and when the rear frame is placed at the fixed position, the torsion spring biases the first pivot part and the second pivot part so that the first positioning block abuts against the second positioning block and thus the rear frame is prevented from pivoting upward beyond the fixed position,
   wherein each of the first pivot part and the second pivot part has a pivot shaft, a groove bottom and a groove wall; the pivot shaft and the groove wall project from the groove bottom; the pivot shaft, the groove bottom and the groove wall define a ring groove around the pivot shaft; and the pivot shaft is placed into the torsion spring, and
   wherein each of the first positioning block and the second positioning block is in form of a rib and each rib is formed in the ring groove and projects from the corresponding groove bottom with a projection height greater than that of the groove wall, so that an engagement of the groove wall of the first pivot part with the groove wall of the second pivot part allows the first positioning block to abut against the second positioning block.

2. The basket frame of a stroller according to claim 1, wherein each of the ribs of the first pivot part and the second pivot part has a cut for fastening a fixing arm at each of the two ends of the torsion spring therein.

3. The basket frame of a stroller according to claim 1, wherein an abutment end of each of the first positioning block and the second positioning block has a T shape.

4. The basket frame of a stroller according to claim 1, wherein the first positioning block and the second positioning block have the same structure.

5. A stroller comprising:
   a stroller frame;
   a seat connected to the stroller frame;
   a wheel pivotally connected to the stroller frame; and a basket frame below the seat, the basket frame comprising:
a front frame;
a rear frame; and
a connecting device connected between the front frame and the rear frame, the connecting device comprising:
a first connector connected to the front frame and having a first pivot part;
a second connector connected to the rear frame and having a second pivot part, the second pivot part being pivotally connected to the first pivot part so that the rear frame can pivot relative to the front frame; and
a torsion spring provided between the first pivot part and the second pivot part, two ends of the torsion spring being respectively placed against the first pivot part and the second pivot part,
wherein an application of a downward force on the rear frame deforms the torsion spring and causes the rear frame to pivot downward, and a removal of the downward force causes a spring return to make the rear frame to return to a fixed position,
wherein the first pivot part has a first positioning block and the second pivot part has a second positioning block, and when the rear frame is placed at the fixed position, the torsion spring biases the first pivot part and the second pivot part so that the first positioning block abuts against the second positioning block and thus the rear frame is prevented from pivoting upward beyond the fixed position,
wherein each of the first pivot part and the second pivot part has a pivot shaft, a groove bottom and a groove wall; the pivot shaft and the groove wall project from the groove bottom; the pivot shaft, the groove bottom and the groove wall define a ring groove around the pivot shaft; and the pivot shaft is placed into the torsion spring, and
wherein each of the first positioning block and the second positioning block is in form of a rib and each rib is formed in the ring groove and projects from the corresponding groove bottom with a projection height greater than that of the groove wall, so that an engagement of the groove wall of the first pivot part with the groove wall of the second pivot part allows the first positioning block to abut against the second positioning block.

6. The stroller according to claim 5, wherein each of the ribs of the first pivot part and the second pivot part has a cut for fastening a fixing arm at each of the two ends of the torsion spring therein.

7. The stroller according to claim 5, wherein an abutment end of each of the first positioning block and the second positioning block has a T shape.

8. The stroller according to claim 5, wherein the first positioning block and the second positioning block have the same structure.

\* \* \* \* \*